United States Patent [19]
Sato et al.

[11] Patent Number: 5,162,661
[45] Date of Patent: Nov. 10, 1992

[54] POSITION DETECTOR FOR MAINTAINING A FIXED DISTANCE BETWEEN TWO OBJECTS

[75] Inventors: Katsuharu Sato; Shoji Taniguchi; Naoharu Yanagawa, all of Saitama, Japan

[73] Assignee: Pioneer Electronic Corporation, Tokyo, Japan

[21] Appl. No.: 608,926

[22] Filed: Nov. 5, 1990

[30] Foreign Application Priority Data

Feb. 8, 1990 [JP] Japan .................................. 2-27189
Feb. 8, 1990 [JP] Japan .................................. 2-27190

[51] Int. Cl.⁵ ............................................ G01N 21/86
[52] U.S. Cl. .................................... 250/561; 250/201.5; 356/375
[58] Field of Search .................... 250/560, 561, 201.5; 356/373, 375, 376, 386, 387; 369/44.13, 44.32

[56] References Cited

U.S. PATENT DOCUMENTS

| | | | |
|---|---|---|---|
| 4,358,960 | 11/1982 | Porter | 250/559 |
| 4,412,746 | 11/1983 | Yokouchi | 356/446 |
| 4,488,813 | 12/1984 | Kissinger et al. | 356/375 |
| 4,670,659 | 6/1987 | Loose | 250/560 |
| 4,711,577 | 12/1987 | Hull-Allen | 356/373 |
| 4,798,964 | 1/1989 | Schmalfuss et al. | 356/376 |
| 4,807,212 | 2/1989 | Kaneda et al. | 369/44 |
| 4,899,061 | 2/1990 | Van Hoek et al. | 358/387 |

FOREIGN PATENT DOCUMENTS 2155049 1/1971 Fed. Rep. of Germany .
2399000 2/1979 France .

Primary Examiner—David C. Nelms
Assistant Examiner—S. Allen
Attorney, Agent, or Firm—Sughrue, Mion, Zinn, Macpeak & Seas

[57] ABSTRACT

A position detector includes: light emitting component for irradiating the surface of an object to be measured; two light receiving components for receiving light reflected by the measured surface, a distance from one of the light receiving components to the measured surface as viewed in a direction substantially perpendicular to the surface being different from a distance from the other of the light receiving components to the surface; calculating circuit for calculating a correction quantity for correcting the distances between the light receiving components and the surface, with the correction quantity being calculated on the basis of a difference between the output signals of the light receiving components; and, moving component for correcting the distances between the measured surface and the light receiving components in accordance with the correction quantity. A first embodiment has two light receiving components each spaced at different distances from the surface. A second embodiment has two light receiving components disposed between two light emitting components, or two light emitting components disposed between two light receiving components. A third embodiment has two light receiving components spaced at a same distance from the surface, but each spaced at different distances from a light emitting components.

26 Claims, 9 Drawing Sheets

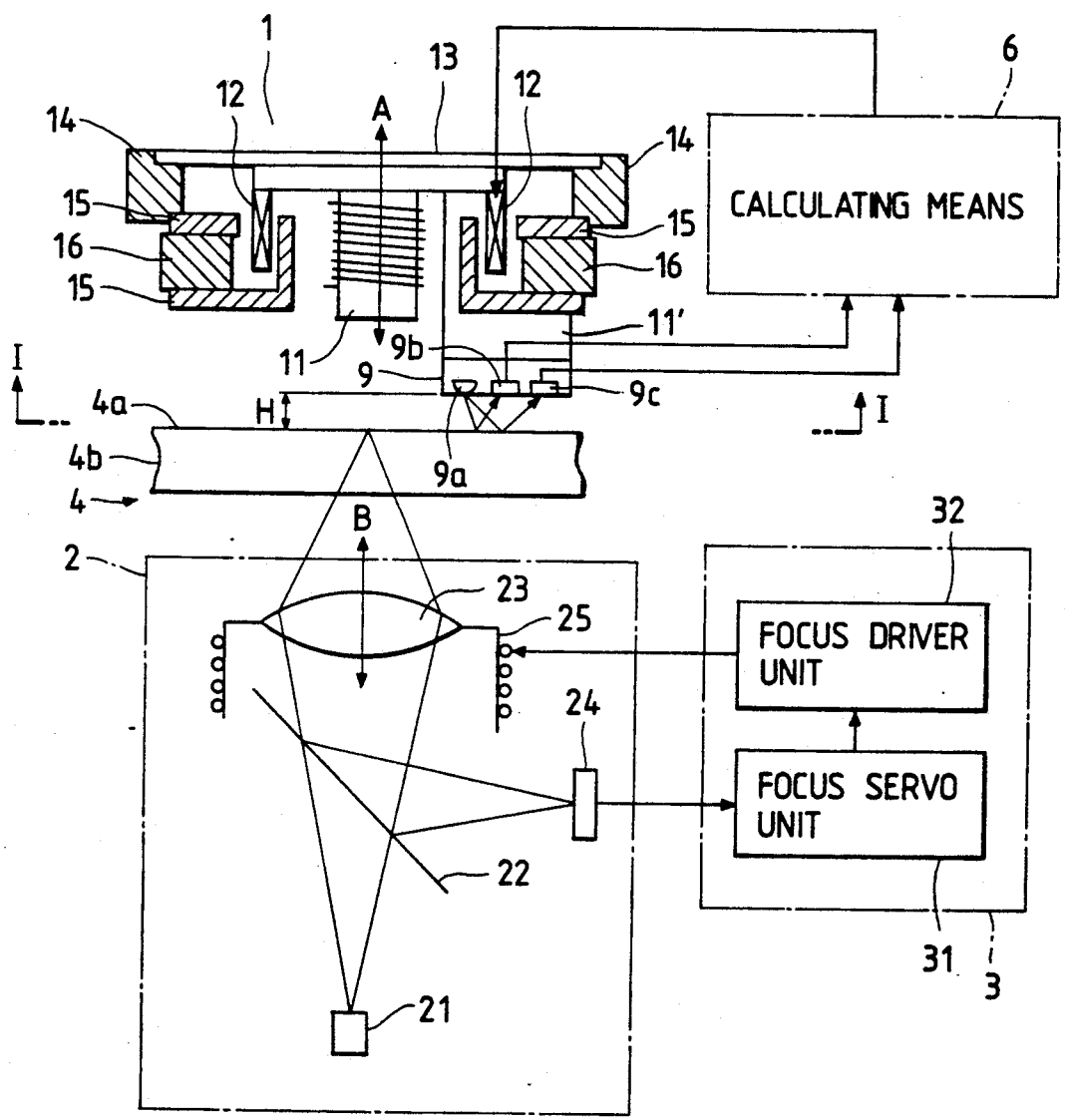

POSITION DETECTOR FOR MAINTAINING A FIXED DISTANCE BETWEEN TWO OBJECTS

FIELD OF THE INVENTION

The present invention relates to a device for maintaininq a fixed distance between two objects, for example, a distance between a magnetic head and a disk. More particularly, the invention relates to a device for maintaining a fixed inclination between the two objects as well as the distance therebetween.

BACKGROUND OF THE INVENTION

One device for maintaining a fixed distance between a measuring device and an object to be measured, is as shown in FIG. 1. In the figure, reference character "a" designates a laser light source, such as an He - Ne laser; "b", a paired light receiving means; and "c", the surface of an object under measurement.

Light emitted from the light source "a" is incident on the surface "c" to be measured and reflected by the surface. The reflected light hits paired elements $b_1$ and $b_2$ of the light receiving means "b". When the surface "c" is positioned as indicated by a solid line in the figure, an output signal of the element $b_1$ is large. When it is positioned as indicated by a two-dotted chain line in the figure, an output signal of the element $b_2$ is large. A vertical distance between the light receiving means "b" and the surface "c" can be known from the output signals of the paired elements $b_1$ and $b_2$.

In the prior art, the light source "a" must be slanted with respect to the surface "c" of the object under measurement, in order that the reflected light is directed to the light receiving means "b". To increase a measurement accuracy, an angle $\theta$ of the light emitted from the light source should be preferably increased. To this end, a distance between the light source "a" and the light receiving means "b" must be increased. The light receiving means "b" consists of two elements $b_1$ and $b_2$, and hence tends to be bulky. Due to the above two factors, the position detector necessarily becomes bulky. The inclination of the surface "c" frequently causes a great measurement error.

A known device to correct the inclination of the surface to be measured is as shown in FIG. 2. Light receiving elements $b_3$ and $b_4$ have the same size, and are disposed equidistant from a light source "a". To correct the inclination of the surface "c", the surface is moved so as to zero a difference between the output signals of the elements $b_3$ and $b_4$.

However, this device is unable to measure the distance between the light receiving elements and the surface to be measured. Thus, neither of the conventional devices is able simultaneously to correct the distance between the light receiving elements and the surface to be measured, and the inclination of the surface.

SUMMARY OF THE INVENTION

Accordingly, an object of the present invention is to provide a position detector which is small in size and which is little influenced by an inclination of an object under measurement.

Another object of the present invention is to provide a position detector which is small in size, and is able to maintain a fixed distance between a light receiving means and the surface of an object under measurement, and also to correct an inclination of the surface.

According to one aspect of the present invention, there is provided a position detector comprising light emitting means for irradiating the surface of an object to be measured, and two light receiving means for receiving light reflected by the measured surface, a distance from one of the light receiving means to the measured surface as viewed in the vertical direction being different from a distance from the other to the measured surface, wherein a correction quantity for correcting the distances between the light receiving means and the measured surface is calculated on the basis of a difference between the output signals of the light receiving means, and the distances between the measured surface and the light receiving means is corrected in accordance with the correction quantity, whereby the difference between the light receiving means and the measured surface, is kept constant, following movement of the measured surface.

According to another aspect of the present invention, there is provided a position detector comprising light emitting means, and two light receiving means for receiving light as emitted from the light emitting means and reflected by the measured surface, a distance from one of the light receiving means to the light emitting means being different from a distance from the other to the light emitting means, wherein a correction quantity for correcting the distances between the light receiving means and the measured surface is calculated on the basis of a difference between the output signals of the light receiving means, and the distance correction quantity is applied to moving means, thereby to correct the distances between the measured surface and the light receiving means.

According to yet another aspect of the present invention, there is provided a position detector comprising at least one light emitting means for irradiating the surface of an object to be measured, and two light receiving means symmetrically disposed with respect to the light emitting means, a distance from one of the light receiving means to the light emitting means being different from a distance from the other to the light emitting means, wherein a correction quantity for correcting the distances between the light receiving means and the measured surface is calculated by comparing the output signals of the light receiving means, and an angle of the measured surface is calculated by comparing the output signals of the light receiving means being symmetrically disposed with respect to the light emitting means, whereby the distances between the light receiving means and the measured surface and the angle of the measured surface are both corrected.

Other objects, features, and advantages of the invention will be apparent when carefully reading the following detailed description in connection with the accompanying drawings, in which:

BRIEF DESCRIPTION OF THE DRAWINGS

FIG. 12 is a diagram showing, in schematic and block form, a fourth embodiment of the present invention in which a position detector of the invention is incorporated into an optomagnetic recording/reproducing apparatus;

DETAILED DESCRIPTION OF THE PREFERRED EMBODIMENTS

Figure 1:
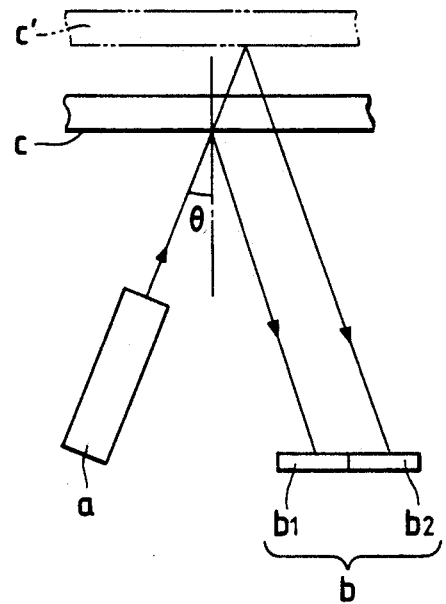
FIG. 1 is an explanatory diagram showing an arrangement of a conventional position detector which is able to correct a distance from a light receiving means to the surface of an object to be measured.
Figure 2:
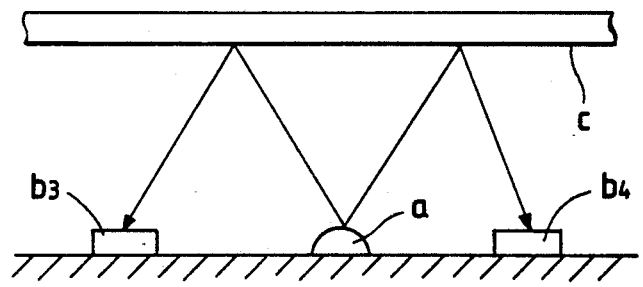
FIG. 2 is an explanatory diagram showing an arrangement of another conventional position detector which is able to correct an inclination of a measured surface.

A first embodiment of the present invention will be described with reference to FIG. 3 and FIGS. 4(a) and 4(b). In the embodiment, a position detector according to the present invention is incorporated into an optomagnetic recording/reproducing apparatus. In the apparatus, the position detector is used for maintaining a fixed distance between a magnetic head and a disk.

In those figures, reference numeral 1 designates a magnetic head section for developing an external magnetic field; 2 an optical head section for emitting a laser beam and detecting a reflected laser beam; 3 a servo control section for effecting a focus servo in the optical head section 2; 4 a disk having a surface to be measured; 5 and 5' photo detectors; and 6 a calculating means for calculating a correction amount from a difference between the output signals of the two photo detectors 5 and 5'.

In the magnetic head section 1, a magnetic head 11, together with a magnetic actuator coil 12 functioning as a moving means, is fixed to a plate spring 13. Both ends of the plate spring 13 are held by the block 14. As a result, the magnetic head 11 is biased to a neutral point. A yoke 15 and a magnet 16 are fixed to the block 14. The moving means 12 is disposed in a magnetic circuit formed of the yoke 15 and the magnet 16.

Support tables 11' and 11", which are continuously extended from a single member, are disposed on both sides of the magnetic head 11. Photo detectors 5 and 5', which are physically and electrically equal to each other, are provided on the support tables 11' and 11", respectively. The photo detector 5 includes a light emitting means 5a and a light receiving means 5b. The photo detector 5, likewise includes a light emitting means 5a' and a light receiving means 5b. As best illustrated in FIG. 4(a), the photo detectors 5 and 5' confront a surface of the disk 4. Of those detectors, the detector 5 is separated from the disk by a distance H as viewed in the vertical direction (i.e., as viewed in a direction substantially perpendicular to the normal surface posture of the disk), and the detector 5' is separated from the disk by the sum of the distance H and another distance L. A light beam emitted from the light emitting means 5a is reflected by the surface of the disk 4, and reaches a plane including the light receiving means 5b and irradiates a circular area 5c shown in FIG. 4(b). A light beam emitted from the light emitting means 5a' likewise is reflected by the surface of the disk 4, and reaches a plane including the light receiving means 5b' and irradiates a circular area 5c' shown in FIG. 4(b). Each of the light receiving means 5b and 5b' produces an output signal which depends on an intensity of the reflected light, and applies it to the calculating means 6. Then, the calculating means 6 supplies a drive current to the moving means 12. The drive current becomes zero when the distance between the magnetic head 11 and a vertical magnetic film 4a of the disk 4 is appropriate (i.e., is of a predetermined distance). The polarity and level of the drive current changes or varies in accordance with a displacement of the head in the vertical direction. This will subsequently be described in detail.

When no drive current is supplied to the moving means 12, the magnetic head 11 is at the neutral position. When the drive current is fed to the moving means 12, the magnetic head 11 moves to a preset position (in the direction of arrow A in FIG. 3) in accordance with the direction and the magnitude of the drive current. The photo detectors 5 and 5', together with the magnetic head 11, are moved, because such components are coupled with one another by the support tables 11' and 11". The distance from the disk 4 to the photo detectors 5 and 5' as viewed in the vertical direction, and the distance between the photo detectors and the magnetic head 11 as viewed also in the vertical direction are preset, so that the drive current fed from the calculating means 6 becomes zero at an optimum distance between the magnetic head 11 and the vertical magnetic film 4a.

In the optical head section 2, a laser beam emitted from a semiconductor laser 21 is transmitted through a beam splitter 22, and is condensed toward the disk 4 by means of an objective lens 23. A laser beam reflected by the vertical magnetic film 4a of the disk 4 is transmitted through a disk substrate 4b and condensed by the objective lens 23, and then is directed toward a focus error detecting portion 24 by means of the beam splitter 22. The focus error detecting portion 24 generates a focus error signal by, for example, an astigmatism method, and outputs it to the servo control section 3. The objective lens 23 is fixed to an objective actuator coil 25. The objective lens 23 is moved in the direction of arrow B in FIG. 3, in accordance with the direction and magnitude of a drive current fed to the actuator coil 25.

In the servo control section 3, a focus servo unit 31 generates a servo signal by using a focus error signal as input thereto, and outputs it to a focus driver unit 32. The unit 32 generates a drive current for focus servo, which varies in accordance with the servo signal, and feeds it to the actuator coil 25. The actuator coil 25 moves the objective lens 23 in a direction to correct a focus error in accordance with the drive current as fed thereto. In this way, the servo control is performed so as to maintain a fixed distance between the disk 4 and the objective lens 23.

Figure 4A:
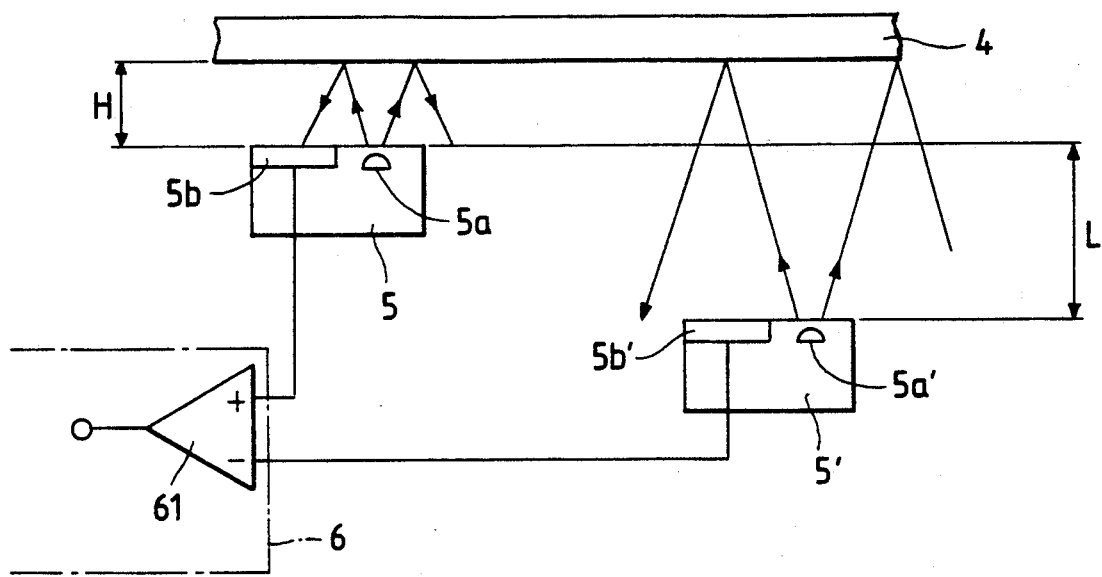
FIG. 4(a) is a diagram showing a key portion of the recording/reproducing apparatus of FIG. 3.
Figure 4B:
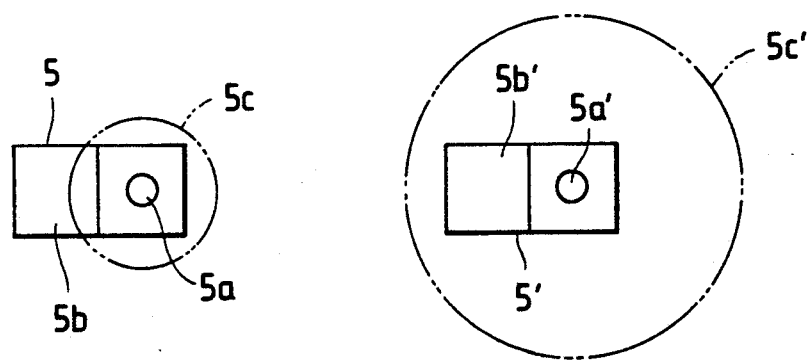
FIG. 4(b) is a plan view showing light receiving means used in the apparatus of FIG. 3.

As shown in FIG. 4(b), the light emitting means 5a of the photo detector 5 irradiates the measured surface or disk 4 within the circular area 5c whose radius depends on the distance from the disk 4. The same thing is true for the photo detector 5'. Part of the reflected light beam from the disk 4 is incident on, and detected by, the light receiving means 5b and 5b', which in turn produce output signals reflecting the amounts of the received light.

The instant embodiment does not use FIG. 1's paired light receiving means which each receive reflected light when a disk is at a different posture or distance. Because of this, the angles of the light beams emitted from the light emitting means 5a and 5a' may be small. The distance between each light emitting means 5a and 5a' and each light receiving means 5b and 5b' may also be small. As a result, the size of the photo detectors may be reduced.

Figure 5:
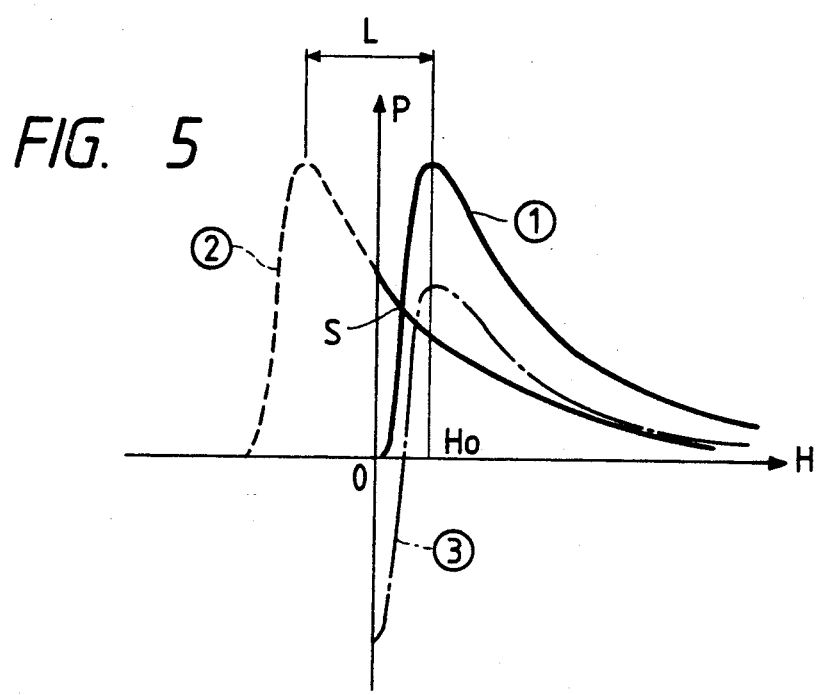
FIG. 5 is a graph showing a relationship between an output power signal P of each light receiving means is in relation to a distance H from the light receiving means to the surface of an object to be measured.

A graphical representation of a relationship between an output power P of each light receiving means 5b and 5b' and the distance H from the disk 4 to each photo detector is as shown in FIG. 5. In the graph, the ordinate represents the output power P of the light receiving means, and the abscissa represents the distance H. A curve (1) indicates a variation of the output power P of the photo detector 5, which is closer to the measured surface or disk. Theoretically, the output power P should be larger as the distance H between the photo detector 5 and the measured surface becomes shorter. Actually, however, it abruptly falls off when the distance H is too short. More particularly, when H=0, no reflected light is incident on the photo detector, and P=0. The reason for this is that when the photo detector is too close to the measured surface, the reflected light is hardly incident on the light receiving means. Accordingly, the curve (1) starts from an origin 0, peaks an Ho, and then gradually falls off. A curve (2) indicates a variation of the output power P of the light receiving means 5b' which is more distant from the measured surface. A profile of the curve (2) resembles that of the curve (1), but as a whole is shifted to the left by the distance L, since the distance of the light receiving means 5b' from the measured surface is H+L.

A difference between the curves (1) and (2) provides a curve (3). If a value of L is too small, both the curves (1) and (2) approach each other. Under such condition, a difference between curves (1) and (2) can hardly be detected. To avoid this, distances of the detectors are set to a condition when preferably L>Ho. By using the value of a curve (3) thus obtained for a servo signal, the magnetic head 11 is moved, thereby to maintain a fixed distance between the magnetic head 11 and the measured surface 4. In this case, if a position of the magnetic head 11 relative to the photo detectors 5 and 5' is selected so as to provide an optimum distance between the magnetic head 11 and the measured surface, a magnetic field which is sufficient enough to record data into the vertical magnetic film 4a can stably be secured, even if the vertical distance varies due to a swing of the disk in the vertical direction.

Figure 6:
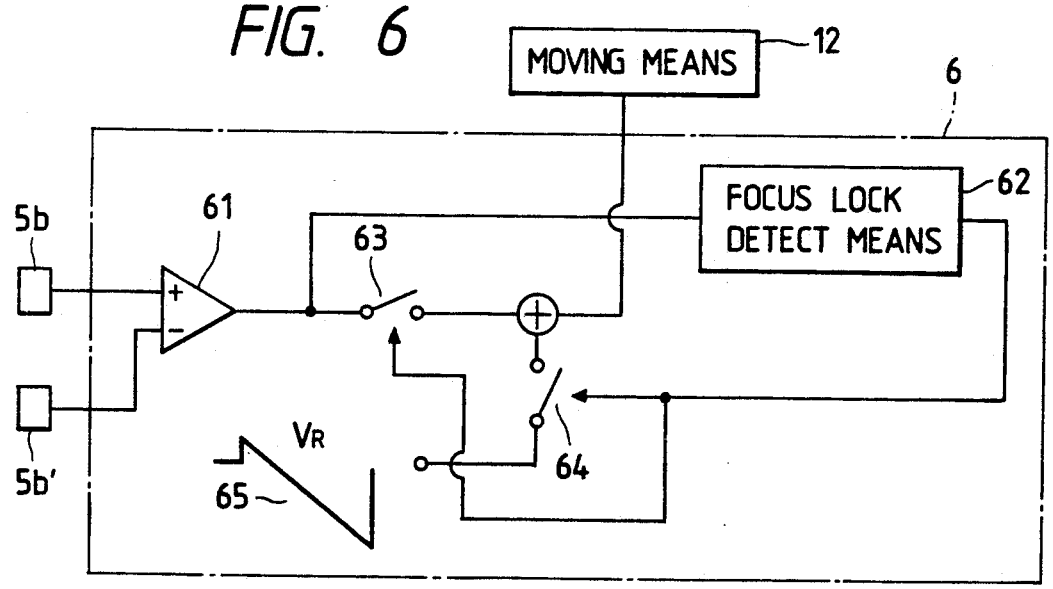
FIG. 6 is a circuit diagram showing a calculating means used in the recording/reproducing apparatus of FIG. 3.

FIG. 6 shows a circuit arrangement of the calculating means c 6 used in this instance. The output signals of the light receiving means 5b and 5b' are coupled with a comparator 61 of the calculating means 6, which detects a difference between the output signals. An output signal of the comparator 61 is supplied to a focus lock detect means 62, which may be an operational amplifier. The means 62 constantly monitors the servo signal as represented by the curve (3). When the servo signal is in a servo pull-in range, the focus lock detect means 62 turns on the switch 63, and turns off the switch 64. The output signal of the comparator 61 is also coupled with the moving means 12 by way of the switch 63. A ramp voltage $V_R$ is inverted and input to a force drive power source 65, and applied to the moving means 12 by way of the switch 64. The reason why the ramp voltage is inverted is that the direction of the magnetic head servo is opposite to that of the servo for the optical system.

The pull-in of the servo signal will first be described. To start, the ramp voltage $V_R$ is input in a loop open state (in a state where the switch 63 is turned off), and is input through the switch 64 to the moving means 12. By application of the ramp voltage $V_R$, the moving means 12 is forcedly moved to a point where it is most distant from the measured surface 4. Then, it is gradually moved toward the measured surface 4. When it is detected that the focus lock detect means 62 falls in a focus pull-in range, the switch 64 is turned off, and at the same time the switch 63 is turned on to close the loop. For the pull-in of the servo for the optical system, the objective lens 23 is gradually moved toward the disk from the point most-distant from the disk, with a ramp voltage having the reverse polarity to that of the ramp voltage $V_R$. A zero-cross point of the focus error signal or its neighborhood is detected in a similar manner, and the servo operation is pulled in. It is for this reason that the ramp voltage for the servo pull-in of the optical system is inverted and is used for the servo pull-in of the magnetic head.

Alternatively, without the focus lock detect means 62, and at the time of servo pull-in of the optical system, the switch 63 is turned on, while the switch 64 is turned off. The reason for this alternative arrangement is that the pull-in point of the servo for the optical system is not always coincident with the optimum servo pull-in point of the magnetic head, but there exists a high probability that the optimum optical servo pull-in point is coincident.

In the instant embodiment, it is preferable that an electrical means is used for making a gain of one of the light receiving elements equal to that of the other. This can readily be realized by coupling a variable resistor or a variable gain amplifier with the output of one of the light receiving elements.

The magnetic head is heated when it is operated. Due to the generated heat, a temperature of the light receiving elements changes so that dark current is generated which causes the output signals of the light receiving elements possibly to drift. Accordingly, when the gain of one of the light receiving elements is adjusted, its dark current component changes and its balance with that of the other light receiving element is lost. As a result, the off balance appears in the form of an offset component in the differential output signal. The dark current as the DC component can be removed in such a way that light emitted from each light emitting element is modulated, and its amplitude component is picked up by an AC coupling means.

The neutral point of the magnetic head 11 is preferably placed at the optimum distance between the head and the disk. However, a slight focus offset will be caused due to the scattering caused by heat. In such a case, a offset voltage is applied to one of the output signals of the photo detectors 5 and 5′. When an apparent error voltage becomes zero, the distance of the magnetic head 11 to the disk has been adjusted to an optimum distance.

In a normal servo state, the output signals of the light receiving means 5b and 5b′ are applied to the comparator 61 in the calculating means 6. The comparator 61 produces an output signal representative of a difference between the output signals of the light receiving means 5b and 5b′. The output signal of the compactor 61 is applied through the switch 63 to the moving means 12. Consequently, the magnetic head 11 is moved in the direction of arrow A in FIG. 3, thereby to maintain the distance between the magnetic head 11 and the measured surface at a fixed distance.

A position detection when the measured surface 4 is slanted will be described with reference to FIGS. 7(a) to 9(b).

In those figures, the measured surface 4, when inclined up from left to right, is denoted as 4′. When inclined down from left to right, it is denoted as 4″. Upper symbols of (+) and (−) at a bottom portion of FIGS. 7(a) to 9(b) indicate changes of the vertical distance from the light receiving means to the measured surface. Lower symbols of (+) and (−) indicate changes of the positions of the reflected light toward the light receiving means, which are due to an inclination of the disk, in terms of changes of the vertical distance.

Figure 7A:
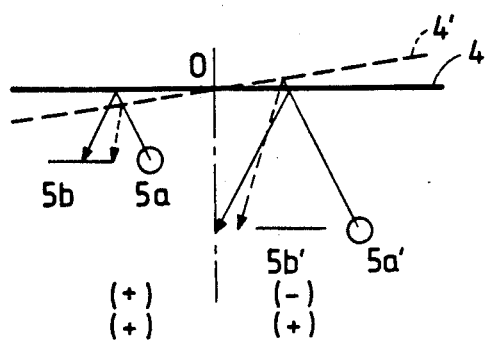
FIGS. 7(a) through 9(b) are diagrams useful in explaining a position detection when a measured surface is slanted.
Figure 7B:
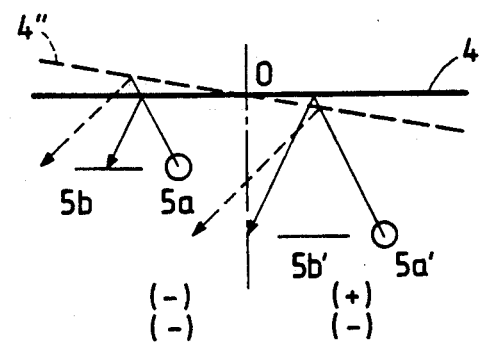

FIGS. 7(a) and 7(b) show a case where the light emitting means 5a and 5a′ and the light receiving means 5b and 5b′ are arrayed into a line, and the light emitting means and the light receiving means are alternately arranged. In FIG. 7(a), it is assumed that when the measured surface 4 is not slanted, the objective lens is focused. Under this condition, the amount of light incident on the light receiving element 5b is equal to that of light incident on the light receiving element 5b′. The output signal of each light receiving element is at point S in FIG. 5. To be more specific, the output power of the photo detector 5b closer to the measured surface does not yet reach its peak as indicated by the curve (1). It reaches the peak when the distance between the photo detector 5b and the measured surface is equal to Ho. At this time, the amount of the reflected light is incident on the photo detector 5b, is maximized. At point S, the light incident on the photo detector 5b, is maximized. At point S, the incident position of the reflected light is closer to the light emitting means 5a than at point Ho, so that the light amount is partially removed, providing a light amount comparable to a point S in FIG. 5.

The output power of the photo detector 5b′ has the profile of (2) in FIG. 5, because, as the reflected light diverges from the measured surface, the reflected light becomes more dispersed from the light emitting means when it is incident on the photo detector 5b′, and hence an amount of lost light increases.

When the measured surface is slanted with respect to the light receiving elements 5b and 5b′ thus arrayed, as indicated by the line 4′ in FIG. 7(a), the reflected light directed toward the light receiving element 5b is deviated in a direction toward the light emitting element 5a as indicated by a dotted line. Accordingly, the amplitude of the output signal of the light receiving element 5b decreases. This is equivalent to such a situation where the photo detector 5 moves nearer to the measured surface, as seen from the curve (1) in FIG. 5.

With respect to the photo detector 5′, the reflected light from the measured surface 4′ changes its path from a solid line path to a dotted line path, and hence, the reflected light is deviated in a direction closer to the light receiving element 5b′. Under this condition, the amount of the reflected light incident on the light receiving element increases. As seen from the curve (2) in FIG. 5, this is equivalent to such a situation where the photo detector 5′ moves nearer to the measured surface.

Thus, both photo detectors produce output powers which are comparable with powers produced by the detectors when the detectors get nearer to the measured surface. With such powers, the servo system controls the magnetic head 11 so as to become more distant from the measured surface 4.

In the case shown in FIG. 7(b), the measured surface is slanted in the direction opposite to that in the case of FIG. 7(a). The incident light to be incident on the light receiving element 5b diverges in a direction away from the light emitting element 5a, as indicated by a dotted line, and accordingly, the power of the light receiving element 5b decreases. This is equivalent to such a situation where the photo detector 5 moves a greater distance away from the measured surface. The same thing is true for the photo detector 5′, and accordingly, the output power of the light receiving element 5b decreases. This is equivalent to such a situation where the photo detector 5 moves a greater distance away from the measured surface. Under this condition, the servo system operates to move the magnetic head toward the measured surface.

Thus, an offset component is superposed on the focus error as the result of the inclination of the measured surface 4 resulting in a non-optimal operation.

Figure 8A:
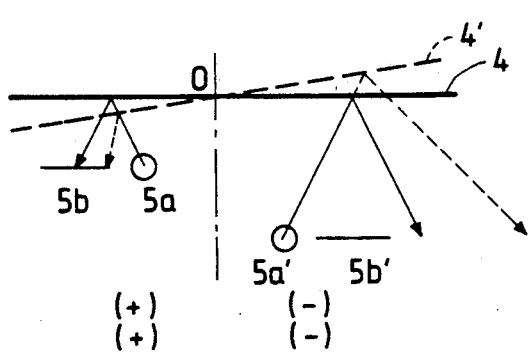
Figure 8B:
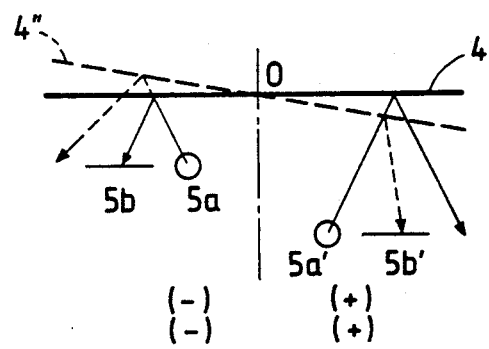

In the cases of FIGS. 8(a) and 8(b), unlike the cases of FIGS. 7(a) and 7(b), the light emitting means 5a and 5a′ are disposed on the inner side of the light receiving means.

In the case of FIG. 8(a), the divergence of the reflected light incident on the light receiving element 5b resembles that in the case of FIG. 7(a). Accordingly, the output power of the light receiving element 5b decreases. This is equivalent to such a situation where the photo detector 5 moves a close distance toward the measured surface. In contrast, the reflected light is incident on the light receiving element 5b′ at a place more distant from the light emitting element 5a′, as in the case where the photo detector 5 moves a greater distance away from the measured surface. Then, the output power of the light receiving element 5b' decreases. Specifically, the output powers of both the light receiving elements 5b and 5b' decrease, and such parallel decrease is canceled out to a certain degree by the comparator 61. Consequently, the adverse effect by the inclination of the measured surface is negligible.

In the case of FIG. 8(b), the output powers of both the photo detectors increase, in contrast with the case of FIG. 8(a). Such parallel increase of powers is also canceled out by the comparator 61.

Figure 9A:
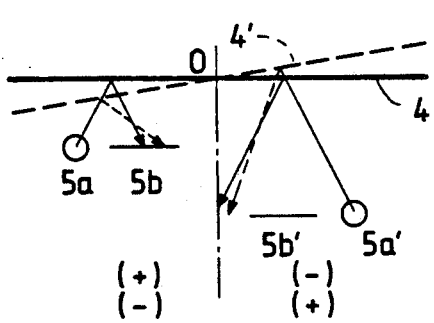
Figure 9B:
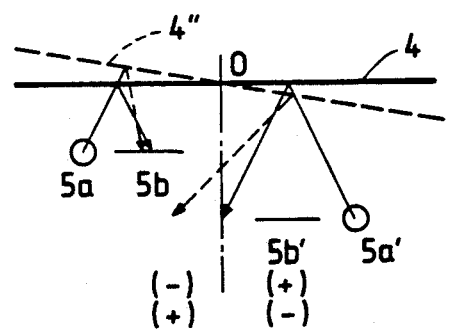

In cases of FIGS. 9(a) and 9(b), the light receiving elements 5b and 5b' are disposed on the inner side of the light emitting elements 5a and 5a', and accordingly, the arrangement of such elements is the reverse of that in FIGS. 8(a) and 8(b). In the case of FIGS. 9(a) and 9(b), the output powers of the photo detectors 5 and 5' change in the same direction. Accordingly, the change components are canceled out by the comparator 61.

As seen from the foregoing description, a position detector which is little influenced by the inclination of the measured surface can be realized by such an arrangement that the two light emitting means and the two light receiving means are arrayed into a line, and the light emitting means are disposed on the inner side of the light receiving means and vice versa.

In the description thus far made, the position detector of the invention is assembled into the optomagnetic recording/reproducing apparatus, and is operative in order to keep the distance between the magnetic head and the disk constant. It should also be evident to those skilled persons in the art that the position detector of the invention is applicable for any other apparatus of the type in which a distance between two members, relatively disposed, must be kept constant.

Figure 10:
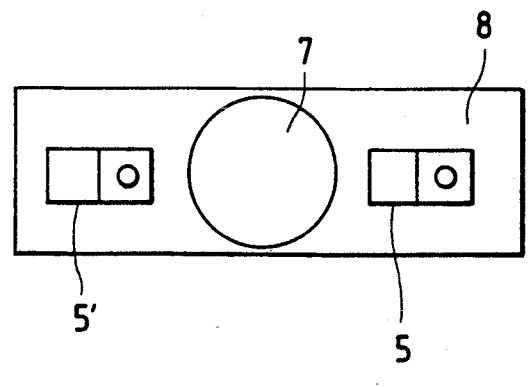
FIG. 10 is a diagram showing a second embodiment of a position detector according to the present invention.

FIG. 10 is a diagram showing a second embodiment of a position detector according to the present invention. In such embodiment, photo detectors 5 and 5' are symmetrically disposed on both sides of a reference measured plane 7, and are fixed to a base 8. Such arrangement can be used to keep a constant distance between the reference measured plane 7 and the measured surface as disposed right above the plane 7, and hence may achieve the objects of the invention more satisfactorily.

Figure 11:
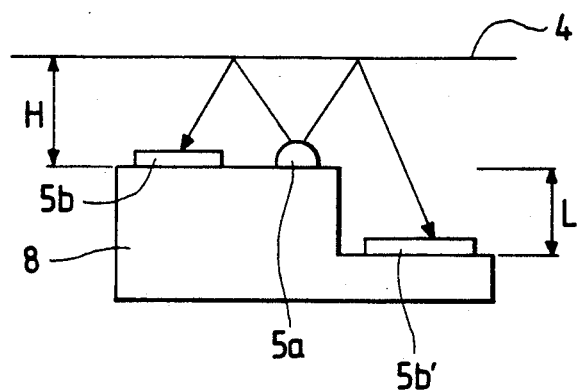
FIG. 11 is a diagram showing a third embodiment of a position detector according to the present invention, in which a single light emitting means is shared by a pair of light receiving means.

FIG. 11 is a diagram showing a third embodiment of a position detector according to the present invention. As shown, a single light emitting means 5a, mounted on the base 8, is used. Two light receiving means 5b and 5b', which are at different vertical levels, are disposed on opposing sides of the light emitting means 5a. Through the use of only a single light emitting means, such arrangement can reduce cost to manufacture, and the size of the position detector.

Figure 3:
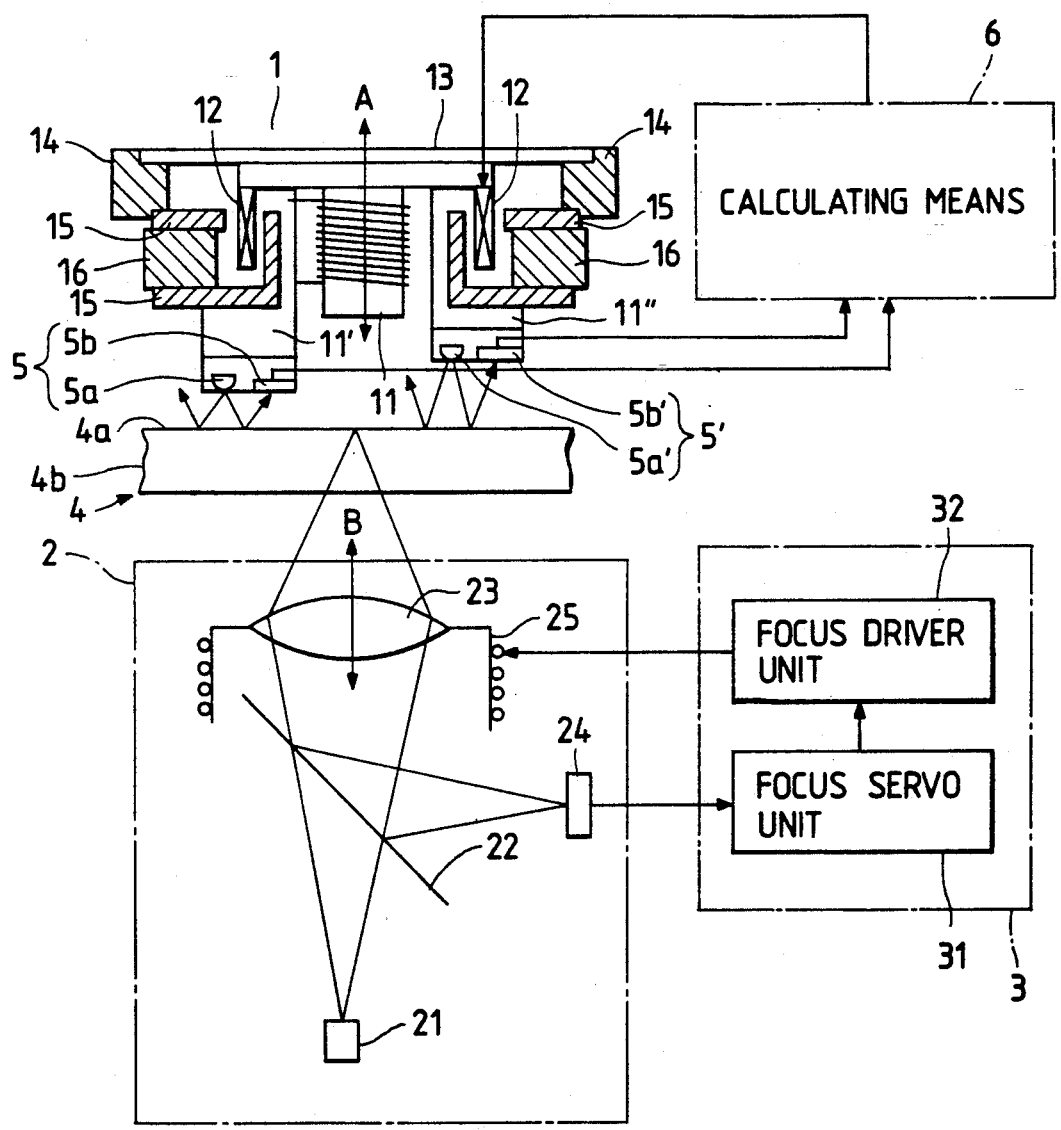
FIG. 3 is a diagram showing, in schematic and block form, a first embodiment of the present invention in which a position detector of the invention is incorporated into an optomagnetic recording/reproducing apparatus.

When applied within the optomagnetic recording/reproducing apparatus shown in FIG. 3, the two photo detectors are preferably disposed in the direction orthogonal to the radius of the optical disk. Otherwise, as the magnetic head 11 moves along the measured surface 4 radius of the disk, the light emitting means or the light receiving means of the photo detectors move beyond the circumferential limits of the disk. In this case, operation is degraded as the light goes outside the disk or the light receiving means cannot receiving the light.

As described above, according to the present invention, the light emitting means and the light receiving means may be closely disposed, realizing a size reduction of the position detector.

Further, with the arrangement that the two light emitting means and the two light receiving means are arrayed into a line, and the light emitting elements are disposed on the inner side of the light receiving means and vice versa, the adverse influence by the inclination of the measured surface can be substantially reduced, thus providing a more exact position measurement.

A fourth embodiment of the present invention will be described with reference to FIG. 12. In the embodiment, a position detector according to the present invention is incorporated into an optomagnetic recording/reproducing apparatus. In the figure, like reference numerals are used for designating like or equivalent portions in FIG. 3. Description will be given placing an emphasis on only those portions of the fourth embodiment that are different from the first embodiment of FIG. 3.

The magnetic head 11 is provided with a support table 11' that is integral therewith. A photo detector 9, which includes a light receiving means 9a and a pair of light receiving means 9b and 9c, are disposed on the magnetic head 11. The magnetic head 11 is aligned with the light emitting means 9a in the radial direction of the disk.

Figure 13:
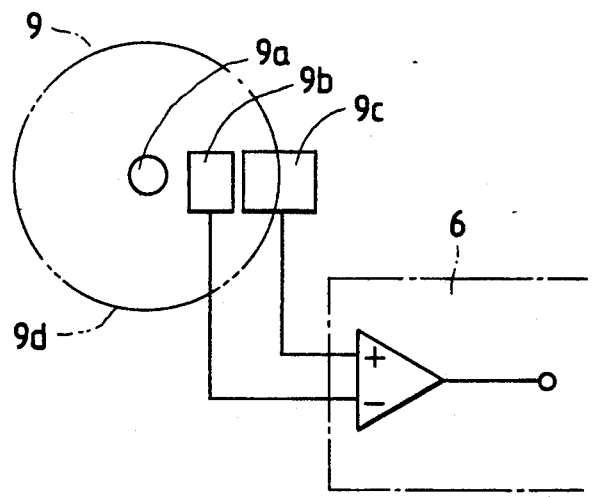
FIG. 13 is a cross-sectional diagram taken along line I—I in FIG. 12.

As shown in FIG. 13, the light receiving means 9b and 9c are each rectangular in shape as viewed from above and separated from the light emitting means 9a by different distances. A circle 9d indicates an illumination area including the light receiving elements 9b and 9c, i.e., the light beam, which is emitted from the light emitting means 9a and reflected from the measured surface 4, falls within the area of the circle 9d. The radius of the circle 9d becomes large in proportion with an increased distance H between the light emitting means 9a and the measured surface 4 (see FIG. 12). The light emitted from the light emitting means 9a is reflected by the area 9d on the measured surface 4 and is incident on the light receiving means 9b and 9c. Each of the light receiving means 9b and 9c produces an output signal which depends on an intensity of the reflected light, and applies it to the calculating means 6. Then, the calculating means 6 supplies a drive current to the moving means 12. The drive current becomes zero when the distance between the magnetic head 11 and a vertical magnetic film 4a of the disk 4 reaches the optimum value. The polarity and level of the drive current changes and varies in accordance with a displacement of the head in the vertical direction. This will subsequently be described in detail.

As described above, the light emitting means 9a of the photo detector 9 irradiates the measured surface 4 within the circular area 9d whose radius depends on the distance H from the disk 4 (FIG. 13). Part of the reflected light from the disk 4 is incident on, and detected by, the light receiving means 9b and 9c, which in turn produce output signals reflecting the amounts of the received light.

Figure 14:
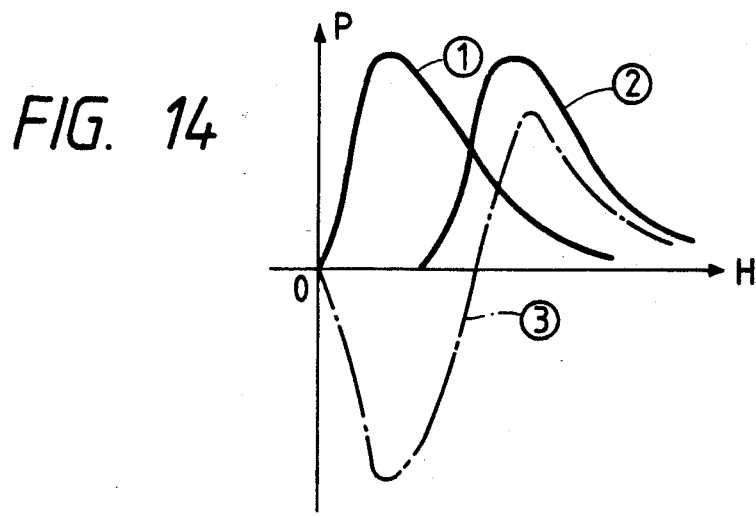
FIG. 14 is a graph showing a relationship between an output power signal P of each light receiving means with respect to a distance H from the light receiving means to the surface of an object to be measured.

A graphical representation of a relationship between an output signal P of each light receiving means 9b and 9c and the distance H between the disk 4 and the photo detector is as shown in FIG. 14. In the graph, the ordinate represents the output power P of the light receiving means, and the abscissa represents the distance H. A curve (1) indicates a variation of the output power P of the light receiving means 9b, which is close to the light emitting means 9a. Theoretically, the output power P should be larger as the distance H between the photo detector 9 and the measured surface becomes shorter. Actually, however, it abruptly falls off when the distance H is too short. When H=0, no reflected light is incident on the photo detector, and P=0. The reason for this is that when the photo detector is too close to the measured surface, the reflected light is hardly incident on the light receiving means. Accordingly, the curve (1) starts from an origin 0, peaks at Ho, and then gradually falls off.

A curve (2) indicates a variation of the output power P of the light receiving means 9c which is more distant from the light emitting means 9a. A profile of the curve (2) resembles that of the curve (1), but is shifted to the right as a whole, since the distance of the light receiving means is more distant from the light submitting means 9a. A light receiving area of the light receiving means 9c is larger than that of the light receiving means 9b, in order that an amount of the reflected light received by the light receiving means 9c is substantially equal to that received by the light receiving means 9b (and, accordingly, a peak level of the curve (1) is substantially equal to that of the curve (2)). A difference between the curves (1) and (2) provides an S-shaped curve (3). By using the value of the curve (3) thus obtained for a servo signal, the magnetic head 11 is moved, thereby to maintain a fixed distance between the magnetic head 11 and the measured surface 4. In this case, if a position of the magnetic head 11 relative to the photo detector 9 is selected so as to provide an optimum distance between the magnetic head 11 and the measured surface, a magnetic field sufficient enough to record data into the vertical magnetic film 4a can always be secured even if the vertical distance varies due to a swing of the disk in the vertical direction.

A circuit arrangement as shown in FIG. 6 is used as the arithmetic calculating means 6. In this instance, the output signal of the light receiving means 9b is applied to the noninverting input terminal of the comparator 61, while the output signal of the light receiving means 9c, is applied to the inverting input terminal.

In a normal servo state, the comparator 61 produces an output signal representative of a difference between the output powers of the light receiving means 9b and 9c. The output signal of the comparator 61 is applied through the switch 63 to the moving means 12. Consequently, the magnetic head 11 is moved in the direction of arrow A in FIG. 12, thereby to maintain the distance between the magnetic head 11 and the measured surface 4 at a fixed distance.

It is possible that the drive signal is directly applied to the moving means 12 from the focus servo unit 31. In this case, a measure must be taken for a deviation of the frequency characteristic that is caused by a weight imbalance of the optical head against the magnetic head, and a displacement of the neutral position due to fatigue of the plate spring 13, and the like. It is noted here that, in the present invention, the focus servo system for the optical system is different from the control system to maintain the distance between the magnetic head and the disk at a fixed value. Because of this feature, the position detector of the present invention is free from the displacement of the neutral point due to spring fatigue and the deviation of the frequency characteristic due to weight imbalance.

Figure 15:
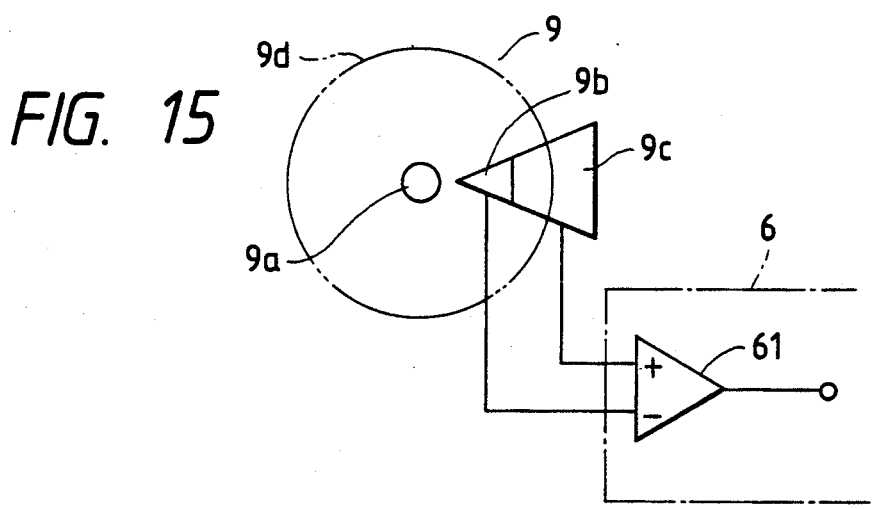
FIG. 15 is a diagram showing a fifth embodiment of a position detector according to the present invention, in which the light receiving means is triangular in shape.

FIG. 15 is a diagram showing a fifth embodiment of a position detector according to the present invention. In this instance, the light receiving means 9b and 9c occupies the upper and lower portion of an equilateral triangle respectively. The triangle is disposed so that its vertex is closer to the light emitting means 9a. The light receiving means 9b and 9c are different in size with respect to light receiving areas and their distances to the light emitting means 9a as viewed in the horizontal direction. Accordingly, such position detector is operable like the embodiment of FIG. 14, and hence, can produce a servo signal to maintain the distance between the photo detector 9 and the measured surface 4 at a fixed value.

Figure 16:
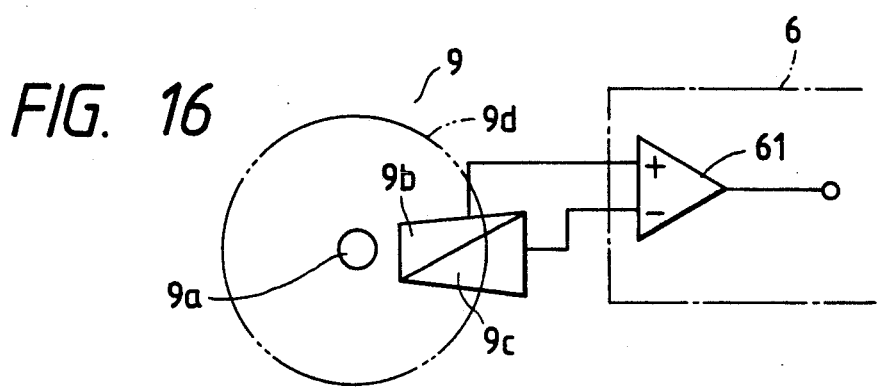
FIG. 16 is a diagram showing a sixth embodiment of a position detector according to the present invention, in which the light receiving means is trapezoidal in shape.
Figure 17:
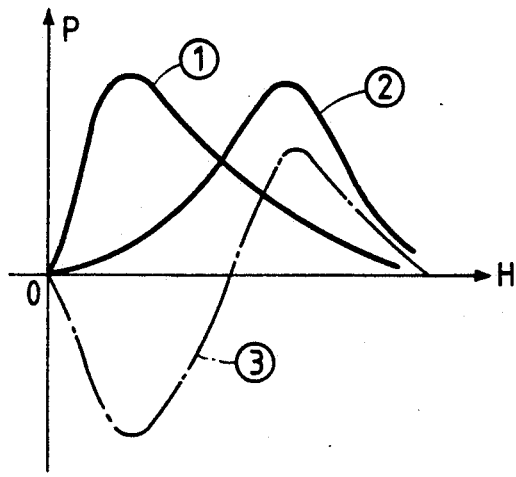
FIG. 17 is a graph showing a relationship between an output power signal P of each light receiving means with respect to a distance H from the light receiving means to the surface of an object to be measured in the embodiment of FIG. 16.

FIG. 16 is a diagram showing a sixth embodiment of a position detector according to the present invention. The light receiving means 9b and 9c, when coupled, form a trapezoid with a top side closer to the light emitting means 9a. The bottom side of the triangular light receiving means 9b and the vertex of the triangular light receiving means 9c are both disposed closer to the light emitting means 9a. The centriod of the light receiving area of the light receiving means 9b is closer to the light emitting means 9a than that of the light receiving means 9c. Accordingly, the output power of the light receiving means 9b varies as indicated by a curve (1) in FIG. 17. As shown, it steeply rises to reach a peak, and gradually falls off. The output power of the light receiving means 9b, as indicated by a curve (2), gently rises to reach a peak, and steeply falls off. A difference of the curves (1) and (2) provides an S-shaped curve (3), that resembles the curve (3) in FIG. 14.

Figure 18:
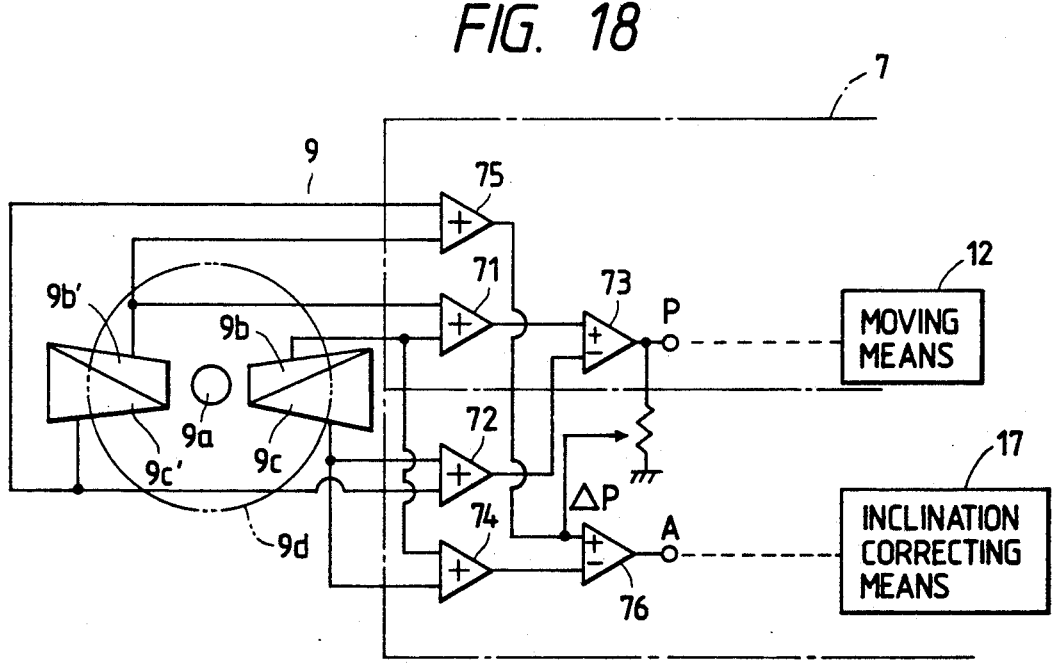
FIG. 18 is a diagram showing a seventh embodiment of a position detector according to the present invention, which is able to correct both the distance from the light receiving means to the measured surface and the angle of the measured surface.

FIG. 18 is a diagram showing a seventh embodiment of a position detector according to the present invention. The position detector of the instant embodiment is capable of correcting both the vertical distance from the measured surface and the inclination of the measured surface. In this instance, a pair of opposing light receiving means 9b and 9c, and 9b', arranged as shown in FIG. 16, are symmetrically disposed with respect to the light emitting means 9a. A calculating means 7 is provided. The sum of the output signals of the light receiving means 9b and 9b' is calculated by an adder 71. The sum of the output signals of the light receiving means 9c and 9c' is calculated by an adder 72. The output signals of the adders 71 and 82 are compared by a comparator 73, thereby to calculate a quantity usable for correcting the vertical distance H. The correction quantity is then applied to the moving means 12.

The sum of the output signals of the light receiving means 9b and 9c is calculated by the adder 74. The sum of the output signals of the light receiving means 9b' and 9c' are calculated by the adder 75. The output signals of the adders 74 and 75 are compared by a comparator 76, and the result of the comparison is applied to inclination correcting means 17. The inclination correcting means is able to correct an inclination of the measured surface in a known manner.

A signal ΔP indicates part of the output signal of the comparator 73 which is applied to the comparator 76, for the inclination detection. An inclination error due to height is corrected by using this quantity ΔP.

In a first approach, the distance correction can be made through the comparison of the output signals from the light receiving means which are located at different distances from the light emitting means 9a, i.e., the result of comparing the output signals of the light receiving means 9b and 9c or 9b' and 9c'. In a second approach, the inclination correction can be made through the comparison of the output signals from the light receiving means which are symmetrically disposed with respect to the light emitting means 9a, i.e., the result of comparing the output signals of the light receiving means 9b and 9b' or 9c and 9c'.

When applied within the optomagnetic recording/reproducing apparatus shown in FIG. 12, the two light receiving means are preferably disposed in the direction orthogonal to the radius of the optical disk. Otherwise, as the magnetic head 11 moves along the radius of the disk, the light emitting means or the light receiving means of the photo detectors move beyond the circumferential boundary of the disk. In this case, the light goes outside the disk or the light receiving means cannot receive the light.

As described above, according to the present invention, the light emitting means and the light receiving means may be closely disposed, realizing a size reduction of the position detector.

Further, with an arrangement wherein the two light emitting means and the two light receiving means are arrayed into a line, and the light emitting elements are disposed on the inner side of the light receiving means and vice versa, the adverse influence of an inclination of the measured surface can be remarkably reduced, thus providing a more exact position measurement.

As seen from the foregoing description, in the present invention, the light emitting means and the light receiving means are closely disposed. Therefore, the resultant position detector is simple in construction and small in size.

With such an arrangement wherein a couple of light receiving elements and another couple of light receiving elements are symmetrically disposed with respect to the light emitting means, and are located at different distances from the light emitting means, the distance between the light emitting means and the measured surface can be controlled to be constant, and the inclination angle of the measured surface can be corrected.

Having herein described some specific embodiments of the present invention, it is believed that obvious modifications and variations of the invention will be apparent to those skilled in the art, and such modifications and variations are meant to be covered within the scope of the claimed invention.

What is claimed is:

1. A position detector comprising:
   first and second light emitting means for irradiating a surface of an object to be measured;
   first and second light receiving means for receiving light reflected by said surface, said first and second light receiving means being positioned adjacent a corresponding one of said first and second light emitting means, in order to receive light from said corresponding light emitting means,
   wherein a distance from said first light receiving and emitting means to said surface as viewed in a direction substantially perpendicular to said surface is less than a distance from said second light receiving and emitting means to said surface;
   calculating means for calculating a correction quantity for correcting the distances between said surface and said light receiving means, said correction quantity being calculated on the basis of a difference between the output signals of said first and second light receiving means; and
   moving means for correcting the distances between said surface and said light receiving means in accordance with said correction quantity.

2. A position detector as claimed in claim 1, in which said first and second light receiving means and said first and second light emitting means are disposed in a linear array when viewed from the surface of said object, and wherein the first and second receiving means are disposed between the first and second light emitting means such that output signals of the light emitting means change by substantially the same amount and in the same direction in response to inclinations of the object surface, and said calculated correction quantity attendantly remains substantially constant.

3. A position detector as claimed in claim 1, in which said first and second light receiving means and first and second light emitting means are disposed in a linear array when viewed from the surface of said object, and wherein the first and second receiving means are disposed between the first and second light emitting means such that output signals of the light emitting means change by substantially the same amount and in the same direction in response to inclinations of the object surface, and said calculated correction quantity attendantly remains substantially constant.

4. A position detector as claimed in claim 1, wherein each of said detecting means generate a peak output power signal when spaced a distance $H_o$ from the surface, said distance from one of said light receiving means being less than distance $H_o$ and said distance from the other light receiving means being greater than distance $H_o$.

5. A position detector as claimed in claim 1, in which the distance between said first and second light receiving means as measured in a direction substantially perpendicular to said surface, is longer than a distance between one of said light receiving means which is closer to said surface, and said surface, as to provide a maximum difference between the output signals of said first and second light receiving means.

6. A position detector as claimed in claim 5, in which said first and second light receiving means and said first and second light emitting means are disposed in a linear array when viewed from the surface of said object, and wherein the first and second emitting means are disposed between the first and second light receiving means such that output signals of the light emitting means change by substantially the same amount and in the same direction in response to inclinations of the object surface, and said calculated correction quantity attendantly remains substantially constant.

7. A position detector as claimed in claim 5, in which said first and second light receiving means and said first and second light emitting means are disposed in a linear array when viewed from the surface of said object, and wherein the first and second emitting means are disposed between the first and second light receiving means such that output signals of the light emitting means change by substantially the same amount and in the same direction in response to inclinations of the object surface, and said calculated correction quantity attendantly remains substantially constant.

8. A position detector comprising:
   at least one light emitting means for irradiating a surface of an object to be measured;
   two light receiving means for receiving light reflected by said surface, a first distance from one of said light receiving means to said light emitting means being different from a second distance from the other of said light receiving means to said light emitting means, said first and second distance lying in a direction parallel to the object surface, and a light receiving area of one of said light receiving means being different from that of the other such that said light receiving means receive different amounts of light from one another and produce different output signals therefrom;

calculating means for calculating a correction quantity for correcting the distances between said surface and said light receiving means, said correction quantity being calculated by comparing the output signals of said light receiving means with one another; and moving means for correcting the distances between said surface and said light receiving means in accordance with said correction quantity.

9. A position detector as claimed in claim 8, wherein each of said detecting means generate a peak output power signal when spaced a distance $H_o$ from the surface, said distance from one of said light receiving means being less than distance $H_o$ and said distance from the other light receiving means being greater than distance $H_o$.

10. A position detector comprising:
at least one light emitting means for irradiating a surface of an object to be measured;
two light receiving means symmetrically disposed with respect to said light emitting means, each of said light receiving means including first and second detectors positioned on opposite sides of said light emitting means, a distance from one of said light receiving means to said light emitting means being different from a distance from the other of said light receiving means to said light emitting means;
first calculating means for calculating a correction quantity for correcting the distances between said light receiving means and said surface, said correction quantity being calculated based on the output signals of said light receiving means; and
second calculating means for calculating an angle of inclination said surface based on the output signals of said light receiving means.

11. A position detector as claimed in claim 10, in which part of the output signal of said first calculating means is applied to said second calculating means, wherein an error of an inclination of said surface is corrected on the basis of a distance quantity.

12. A position detector as claimed in claim 10, wherein said first and second detectors form a triangle with said first detector forming a top portion of the triangle and the second detector forming a bottom portion thereof.

13. A position detector as claimed in claim 10, wherein said first and second detectors form first and second triangles with the first triangle having a top directed toward the light emitter and the second triangle having a bottom directed toward the light emitter.

14. A position detector as claimed in claim 10, wherein said correction quantity equals a difference between a sum of the outputs of said first and second detectors in one of the light receiving means and a sum of the outputs of said first and second detectors in the other of said light receiving means.

15. A position detector as claimed in claim 10, wherein said angle of inclination of said surface equals a difference between a sum of the outputs of said first detectors and a sum of the outputs of said second detectors.

16. A position detector comprising:
first and second light emitters to irradiate a surface of an object to be measured;
first and second photo detectors to receive light emitted by a corresponding one of said first and second light emitters and reflected from said surface, said first and second detectors being spaced first and second distances, respectively, from said surface, said first distance being different from said second distance, said first and second detectors being positioned adjacent the corresponding emitter and being spaced said first and second distances, respectively, from said surface; and
a calculation circuit to determined a correction quantity for changing a distance between the surface and said first and second detectors, said correction quantity representing a difference between output signals of said first and second detectors.

17. A position detector as claimed in claim 16, further including:
a mover to change the distance between said surface and said first and second detectors by an amount corresponding to said correction quantity.

18. A position detector as claimed in claim 16, wherein each of said first and second detectors generate a peak output power signal when spaced a distance $H_o$ from the surface, said first distance being less than distance $H_o$ and said second distance being greater than distance $H_o$.

19. A position detector as claimed in claim 16, wherein said first and second light emitters are positioned between said first and second detectors.

20. A position detector as claimed in claim 16, wherein said first and second detectors are positioned between said first and second light emitters.

21. A position detector comprising:
one light emitter to irradiate a surface of an object to be measured;
first and second photo detectors to receive light reflected from said surface, said first and second detectors being spaced equal distances from said surface, with said first detector positioned closer to said light emitter than said second detector, said second detector having a larger surface area than said first detector,
a calculation circuit to determine a correction quantity for changing a distance between the surface and said first and second detectors, said correction quantity representing a difference between output signals of said first and second detectors.

22. A position detector as claimed in claim 21, further comprising:
a mover to change the distance between said surface and said first and second detectors by an amount corresponding to said correction quantity.

23. A position detector as claimed in claim 21, wherein said first and second detectors form a triangle with said first detector forming a top portion of the triangle and the second detector forming a bottom portion thereof.

24. A position detector as claimed in claim 21, wherein said first and second detectors form first and second triangles with the first triangle having a top directed toward the light emitter and the second triangle having a bottom directed toward the light emitter.

25. A position detector comprising:
at least one light emitter positioned to irradiate a surface of an object to be measured;

first and second photo detectors positioned to receive light reflected from said surface and to generate first and second output signals therefrom, each of said first and second detectors having a characteristic output curve, of output power versus distance between a corresponding one of said detectors and said surface, wherein said output curve has an increasing slope to a peak and then a decreasing slope away from said peak as said corresponding detector moves in a direction away from said surface;

said first and second detectors being positioned on a platform movable toward and away from said object and being positioned with respect to one another so that when the platform is at an optimum distance from said object, said first detector having a larger receiving area and being positioned a greater distance from said light emitter than said second detector, in order to maintain said first output signal along the increasing slope of the characteristic curve of said first photo detector, and said second output signal along the decreasing slope of the characteristic curve of said second photo detector; and a comparison circuit connected to compare said first and second output signals.

26. A position detector as claimed in claim 25, wherein said first and second output signals maintain a predetermined relationship of equality to one another.

* * * * *